(12) United States Patent
Buzzoni

(10) Patent No.: US 7,527,128 B2
(45) Date of Patent: May 5, 2009

(54) PINLESS WHEEL BUMPER BLOCK

(75) Inventor: Guy A. Buzzoni, Charlotte, NC (US)

(73) Assignee: APM Terminals North America, Inc., Charlotte, NC (US)

( * ) Notice: Subject to any disclaimer, the term of this patent is extended or adjusted under 35 U.S.C. 154(b) by 476 days.

(21) Appl. No.: 10/183,478

(22) Filed: Jun. 28, 2002

(65) Prior Publication Data
US 2003/0213656 A1 Nov. 20, 2003

Related U.S. Application Data

(60) Provisional application No. 60/380,827, filed on May 17, 2002.

(51) Int. Cl.
B60T 1/14 (2006.01)
E01F 9/06 (2006.01)
(52) U.S. Cl. .............. 188/5; 188/4 R; 188/32; 404/6
(58) Field of Classification Search ............. 188/4 R, 188/5, 7, 32; 404/6–16; D25/38, 112; D10/109, D10/110, 114
See application file for complete search history.

(56) References Cited

U.S. PATENT DOCUMENTS

| 2,935,162 | A | * | 5/1960 | Lindsay | 404/6 |
|---|---|---|---|---|---|
| 4,068,968 | A | * | 1/1978 | Gagle et al. | 404/7 |
| 4,203,685 | A | * | 5/1980 | Sanchez | 404/6 |
| 4,348,133 | A | * | 9/1982 | Trent et al. | 404/6 |
| 4,594,021 | A | * | 6/1986 | Schafer et al. | 404/14 |
| 4,844,652 | A | * | 7/1989 | Schroughan | 404/6 |
| 5,111,754 | A | * | 5/1992 | Adams, Jr. | 108/51.3 |
| 5,122,008 | A | * | 6/1992 | Drews | 404/6 |
| 5,306,105 | A | * | 4/1994 | Langbrandner et al. | 404/12 |
| 5,639,179 | A | * | 6/1997 | Jensen | 404/6 |
| 5,882,140 | A | * | 3/1999 | Yodock et al. | 404/6 |
| 5,897,286 | A | * | 4/1999 | Whittaker | 414/607 |
| 5,902,068 | A | * | 5/1999 | Angley et al. | 404/34 |
| D418,167 | S | * | 12/1999 | Stutsman | D20/15 |
| D425,440 | S | * | 5/2000 | Franklin | D10/113 |

FOREIGN PATENT DOCUMENTS

| JP | 9177357 | * | 7/1997 |
|---|---|---|---|
| JP | 11117563 | * | 4/1999 |

* cited by examiner

*Primary Examiner*—Melody M Burch
(74) *Attorney, Agent, or Firm*—Morgan, Lewis & Bockius LLP

(57) ABSTRACT

An anchorless wheel bumper block is used as a stop in a parking facility. The block includes a base with a bottom surface, a top with an upper surface, and a side extending around a perimeter of the block and between the bottom and upper surfaces. The bottom surface rests on a ground surface and the block is in contact with and unattached to the ground surface in an in-use position. The bottom surface is disposed in a first plane and has a length. The upper surface is disposed in a second plane generally parallel to the first plane. A distance between the bottom and upper surfaces defines a height of the block. The length is substantially greater than the height of the block. The block remains substantially in the in-use position when a wheeled unit contacts the block.

8 Claims, 10 Drawing Sheets

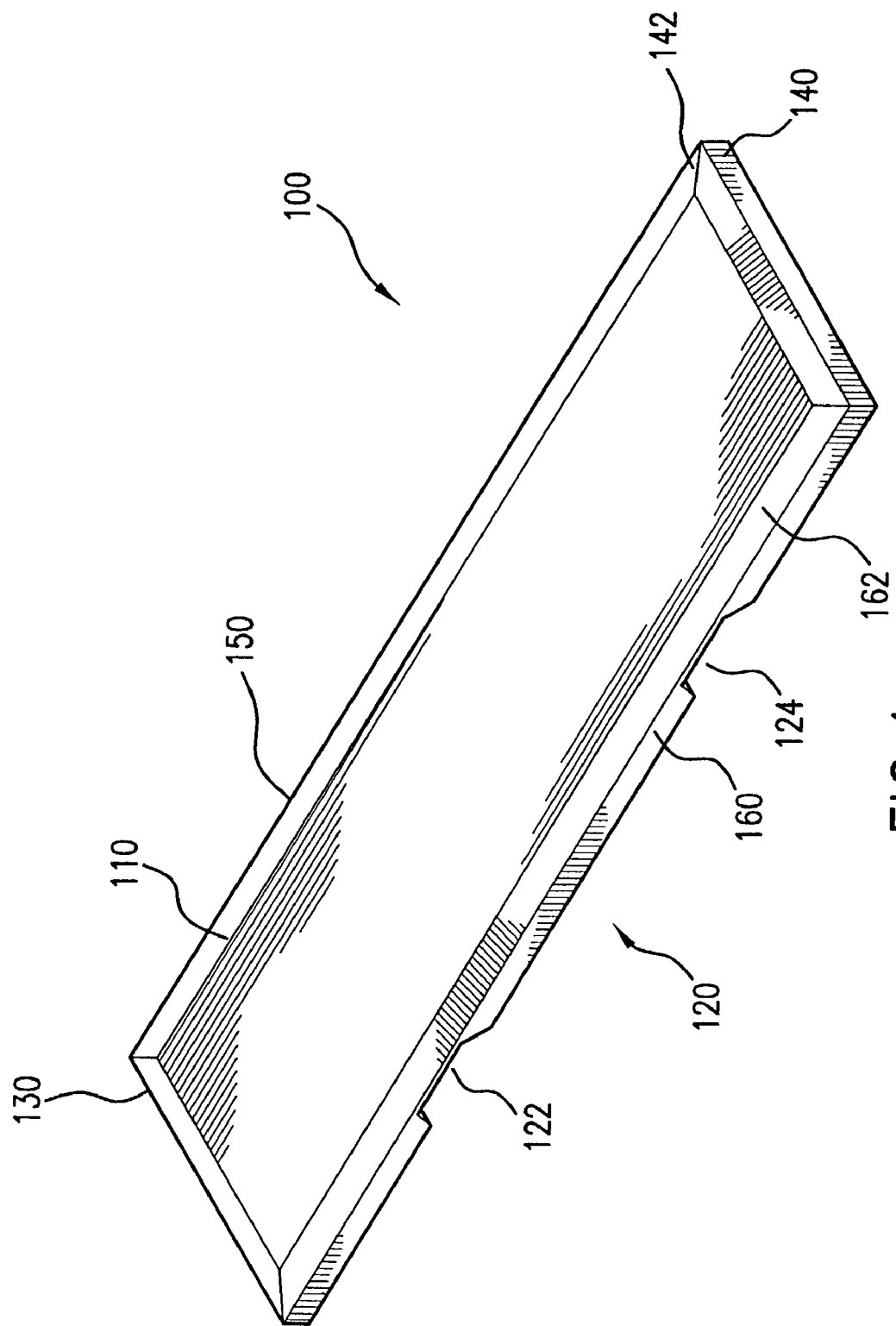

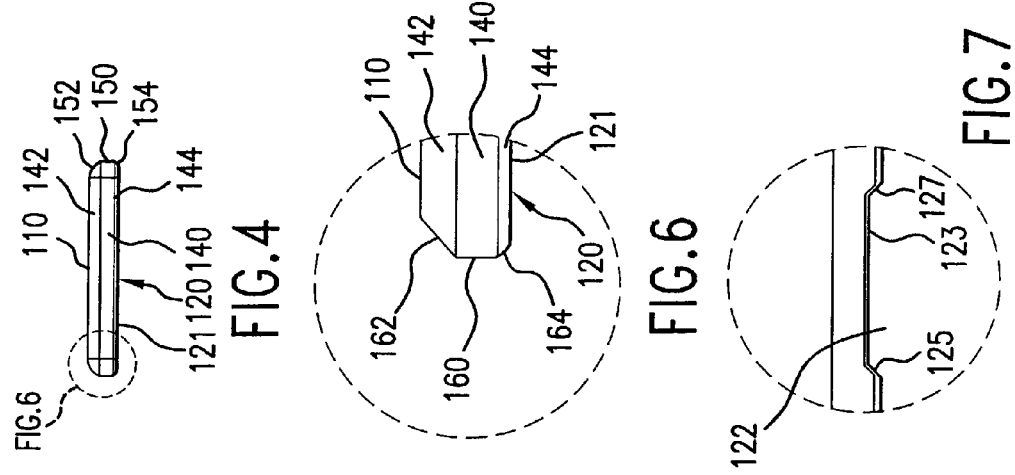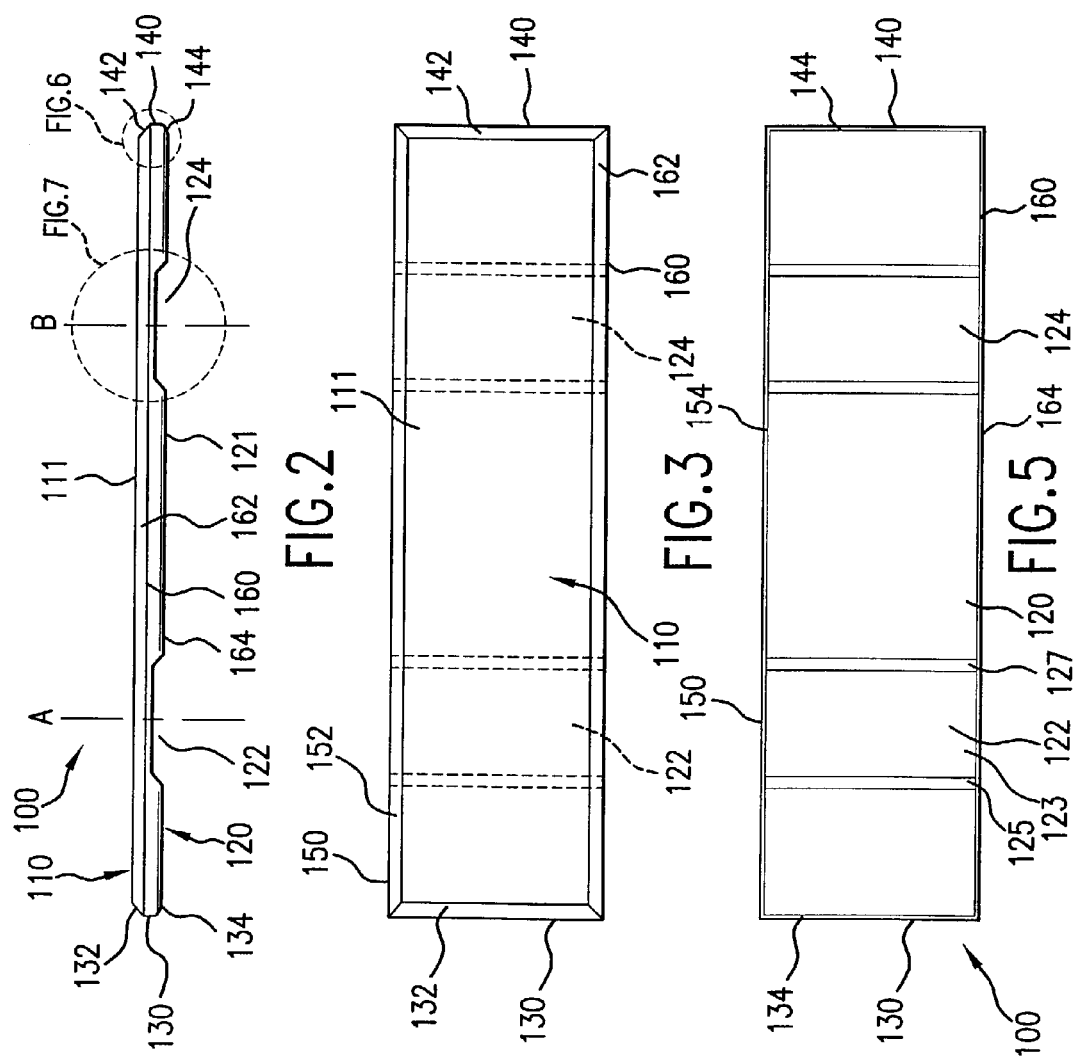

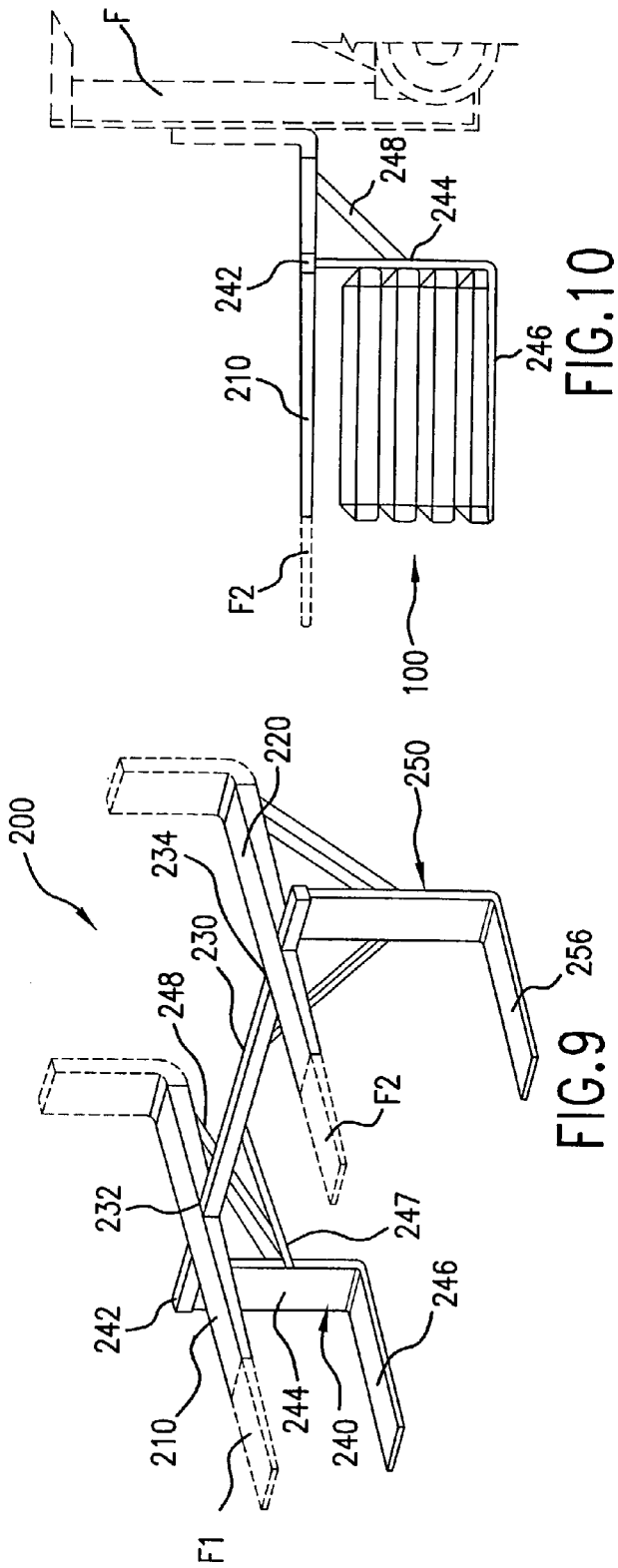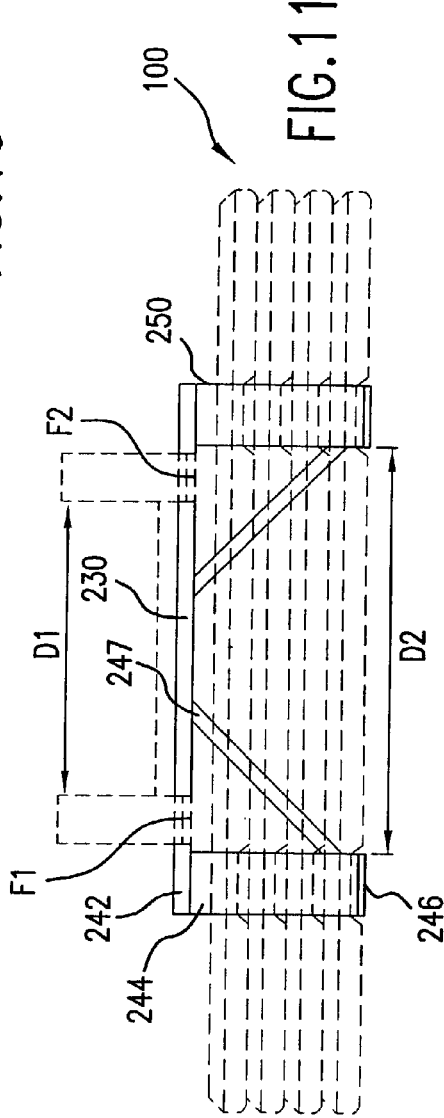

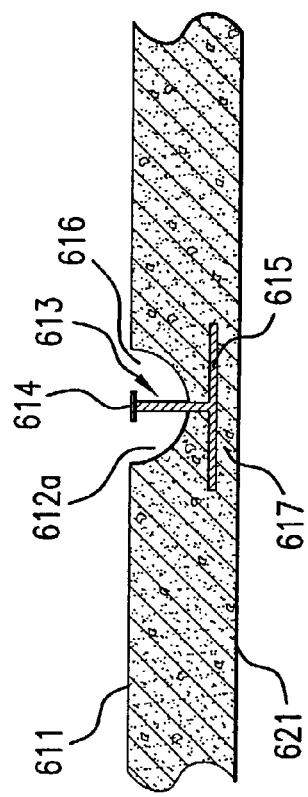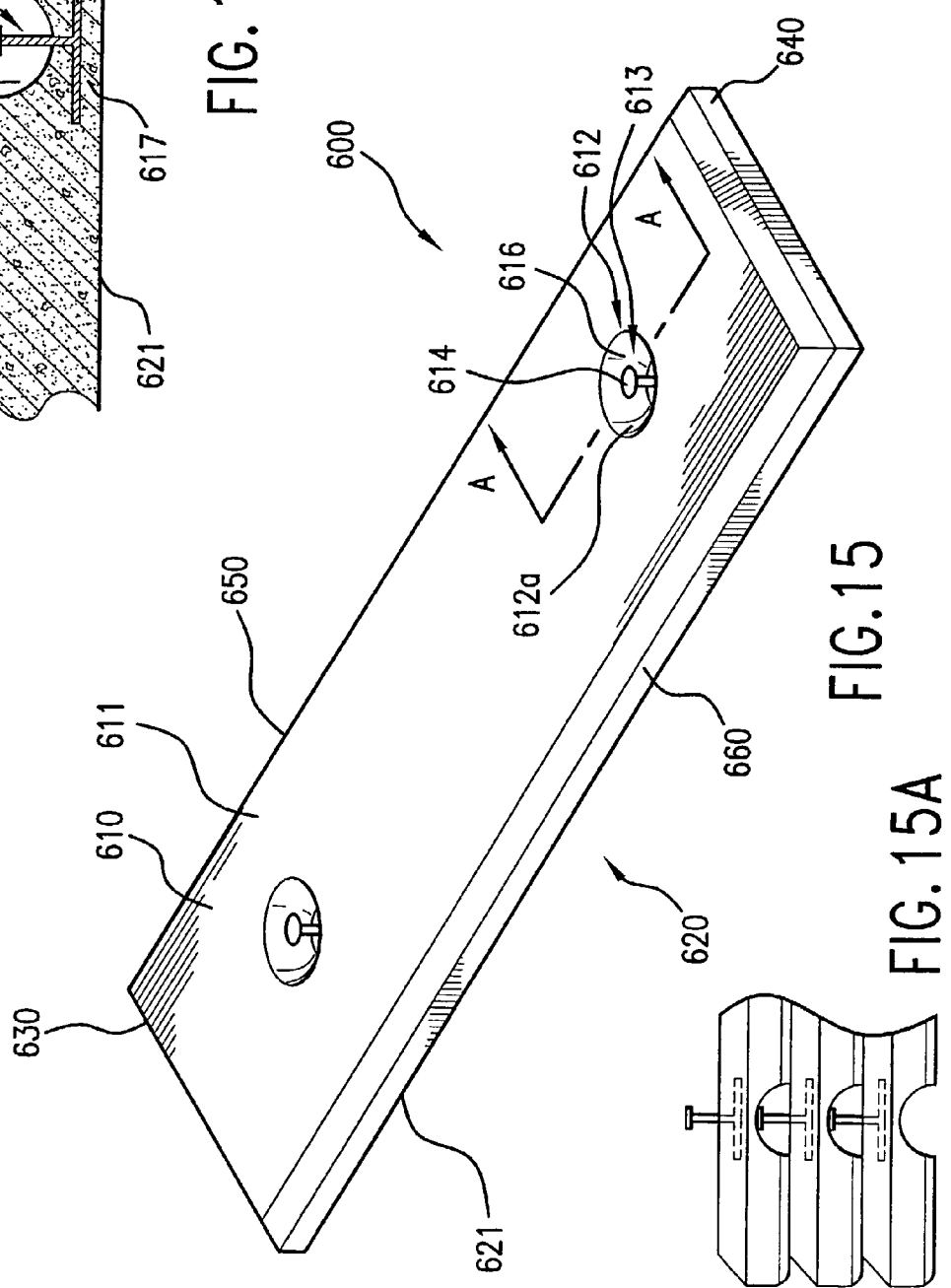

PINLESS WHEEL BUMPER BLOCK

CLAIM FOR PRIORITY

This application claims the benefits of U.S. Provisional Application No. 60/380,827, filed on May 17, 2002, which is hereby incorporated by reference in its entirety.

BACKGROUND OF THE INVENTION

1. Field of the Invention

The invention relates to a wheel bumper block, and more particularly to a pinless wheel bumper block capable of being readily relocated and rearranged.

2. Description of the Related Art

Marine container shipping involves using standardized shipping containers to ship cargo. Shipping cargo in these standardized containers facilitates loading, unloading and storage at a port site. Once offloaded from a merchant vessel at the port site, the containers can be stored in terminals specifically laid out to temporarily house large quantities of these containers prior to distribution. The containers can be stored in the terminals in either of two ways. One way, is by stacking containers one on top of another and positioning these stacks of containers within the terminal. Such containers can be referred to as grounded containers. Alternatively, a container can be mounted onto wheeled semi-truck flatbeds or chassis and parked in individual parking stalls at the terminal. Such containers can be referred to as shipping or wheeled containers.

Because wheeled containers usually are not stacked, wheeled containers occupy more storage space than grounded containers. Thus, it is desirable to optimize limited storage area for wheeled containers by parking them close together, including, back-to-back and/or against walls, fences, or perimeters. To accurately position these wheeled containers as well as to avoid collision and damage, pinned wheel bumper blocks are generally used to delineate certain parking boundaries for wheeled containers. These bumper blocks are referred to as pinned wheel bumper blocks, because they have vertical pin holes adapted to receive steel rods or dowels that are either driven or drilled through the pin holes and into the underlying pavement. Generally, there is a clearance gap between the pin and the pin hole. To adequately secure the block and pin to each other, grout is added to the clearance gap of pin hole in the block. Without securing the pin in the block, the block and pin can become disengaged from one another when a backed-in wheeled container applies sufficient force to the block. Some conventional bumper blocks are also secured to the pavement using an adhesive to form a cementitious bond between the bottom of the concrete block and the pavement asphalt. Once the pinned blocks are installed in the desired pattern, typically at one end of the parking stalls, as shown for example in FIGS. 20 and 21, the wheeled container is backed into the parking stall until the wheels contact the pinned wheel bumpers, which indicates to the driver that the wheeled container is properly aligned. Because the wheel bumper is anchored to the ground by the above-described pins, it will remain in position, and not slide when contacted, bumped, or forced by the wheeled container.

These parking facilities, including terminals in marine container environments periodically require rearrangement to change the amount of space allocated between grounded container and wheeled container storage. Accommodating such changes may require rearrangement of an existing wheeled container parking configuration. Installing, removing and rearranging pinned wheel bumper blocks is labor intensive. When more grounded container space is needed, it is often necessary to remove pinned wheel bumper blocks from the pavement. When removing the blocks, the grouted pins are also removed from the underlying pavement structure. Thus, removing the blocks and pins damages the pavement structure and leaves holes in the surface, which can be hazardous and/or require repair. Furthermore, re-using the pinned wheel bumper block requires that the grouted pin be removed or extracted, which often can damage or destroy the block rendering it unusable. Additionally, although a compatible forklift can be used to transport the pinned wheel bumper blocks, because of the configuration of these blocks, as shown in FIGS. 17-19, the blocks cannot be easily stacked for transport or storage during periods of non-use. This further increases the time required to rearrange wheeled parking stalls and storage of the unused blocks can take-up valuable storage space. What is needed is a wheel bumper block that can be readily installed, rearranged without damaging the underlying pavement structure or the wheel bumper itself and easily stored in a limited space during periods of non-use. As illustrated in FIGS. 17-19, the pinned wheel bumper blocks typically are made of a precast, reinforced concrete block, 4 to 8 feet long, 12 inches wide, 7 inches high, and weigh approximately between 350 to 700 pounds. Because the pinned block is anchored to the ground by steel pins driven into the ground or underlying pavement and then grouted as described above, the block remains in position, particularly when the force of the wheeled container is applied against it. Where a single row of wheeled parking stalls is placed, for example, against a fence or building, these pinned wheel bumper blocks protect the adjacent structure from damage by preventing the container chassis from being backed beyond the limits of the parking stall. Where two rows of wheeled parking stalls are placed back-to-back, these pinned wheel bumper blocks separate the two rows by preventing container chassis from being backed into one another, as shown in FIGS. 20 and 21. Thus, the pins are important to fixedly secure the blocks in position and prevent the block from moving, shifting and/or tipping.

Finally, when product including, but not limited to bumper blocks, is transported using a forklift, the forklift should be of the type that can accommodate the lifting and transporting of a given load. If a forklift cannot accommodate the load, i.e., it is an out-of-gage load, then the forklift can be referred to as incompatible forklift and under such circumstances, a different forklift should be used, that is, one that can accommodate the load, which can be referred to as a compatible forklift.

Having to use different forklifts can be problematic because a compatible forklift would have to be obtained. As a result, what also is needed is a forklift adapter, which would allow using an incompatible forklift to lift and transport an out-of-gage load, including but not limited to a wheel bumper block. Such a forklift adapter would convert an incompatible forklift to a compatible forklift.

SUMMARY OF THE INVENTION

The invention solves the problems and overcomes the disadvantages of the prior art. For example, the invention accomplishes this by providing an anchorless wheel bumper block for use as a stop in a parking facility, such as in industrial or commercial trucking, warehousing distribution, intermodal facilities, rail yards, and equipment yards. The anchorless wheel bumper block includes a base that has a bottom surface, a top that has an upper surface, and a side extending around a perimeter of the block and between the bottom and upper surfaces. The bottom surface is disposed in a first plane, has a first length, and rests on a ground surface. The upper surface is disposed in a second plane, which is generally parallel to the first plane. A distance between the bottom and upper surfaces defines a height of the block, and the length is substantially greater than the height of the block. The block is in contact with and unattached to the ground surface in an in-use position and remains substantially in the in-use position when a wheeled unit contacts the block.

According to another aspect of the invention, a wheeled parking system including wheeled unit parking locations is provided. The wheeled parking system includes a ground surface in an original condition and an anchorless wheel bumper block for use as a stop. The block is disposed at an end of the wheeled unit parking location and prevents a wheeled unit from exiting the parking location. When the wheeled unit contacts the block, the block remains in substantially the in-use position. When the block is lifted from the ground surface and moved to a non-use position, the ground surface remains substantially in the original condition. The bumper block has a substantially flat and elongate shape and includes a base that has a bottom surface, a top extending from the base that has an upper surface, a side extending around a perimeter of the block and between the bottom and upper surfaces. The bottom surface rests unattached on the ground surface and the block is unattached to the ground surface in an in-use position. The bottom surface has a first size, and the upper surface has a second size, which is substantially equal to the first size.

In yet another aspect of the invention, a parking facility anchorless wheel bumper block is provided. The anchorless bumper block includes a bottom portion, a top portion, and a side extending around a perimeter of the block between the bottom and top portions. The bottom portion is disposable on a ground surface in an in-use location adjacent a wheeled unit parking location. The bottom portion has a first surface area. The block is anchorless and unsecured to the ground surface in the in-use location. The top portion has a second surface facing away from the ground surface and has a second surface area, which is substantially equal to the first surface area. The block remains substantially in the in-use location when a wheeled unit contacts the block.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide further understanding of the invention and are incorporated in and constitute a part of this specification, illustrate preferred embodiments of the invention, and, together with the detailed description below, serve to explain the principles of the invention. In the drawings:

FIG. 1 shows a perspective view of a pinless wheel bumper block in accordance with the principles of the invention.

FIG. 2 shows a side elevation view of the pinless wheel bumper block of FIG. 1.

FIG. 3 shows a top plan view of the pinless wheel bumper block of FIG. 1.

FIG. 4 shows another side elevation view of the pinless wheel bumper block of FIG. 1.

FIG. 5 shows a bottom plan view of the pinless wheel bumper block of FIG. 1.

FIG. 6 shows an expanded view of an edge of the pinless wheel bumper block of FIG. 1.

FIG. 7 shows an expanded end view of one of the forklift pockets of the pinless wheel bumper block of FIG. 1.

FIG. 9 shows a perspective view of a forklift adapter coupled to an incompatible forklift for transporting the pinless wheel bumper blocks made in accordance with the invention.

FIG. 10 shows a side view of the forklift adapter of FIG. 9 coupled to an incompatible forklift and also showing a portion of the non-compatible forklift; and where four blocks of FIG. 1 are disposed on the forklift adapter.

FIG. 11 shows a front view of the forklift adapter of FIG. 9 and several stacked blocks of FIG. 1.

FIG. 15 shows another alternate embodiment of a pinless wheel bumper block made in accordance with the principles of the invention.

FIG. 15A shows a side elevation view of a stack of pinless wheel bumper blocks made in accordance with the principles of the invention.

FIG. 16 shows a side elevation view of the pinless wheel bumper block of FIG. 15 taken along a line A-A.

DETAILED DESCRIPTION OF THE PREFERRED EMBODIMENTS

Figure 8:
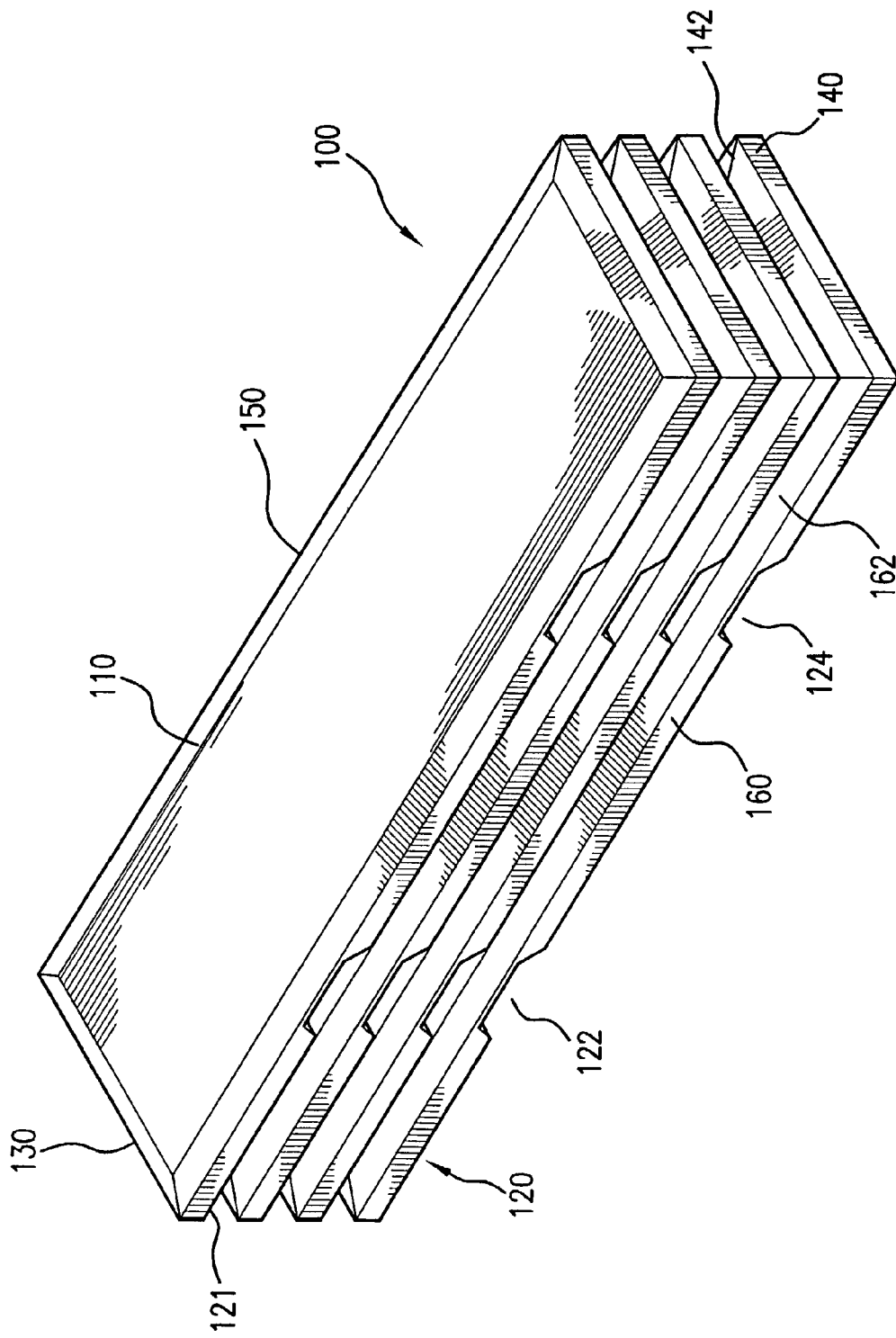
FIG. 8 shows a stack of several of the pinless wheel bumper blocks of FIG. 1.

Reference will now be made in detail to preferred embodiments of the invention, examples of which are illustrated in the accompanying drawings.

Referring to FIGS. 1 through 7, a preferred embodiment of a pinless wheel bumper block 100 is shown, for use in, for example, a marine container terminal or other type of space that has a need for wheel bumper blocks. In use, block 100 rests on a ground surface or underlying pavement without being secured or anchored, for example, by a pin, rod, or cementitious bond and, thus, can be referred to as a pinless wheel bumper block.

As illustrated best in the perspective view of FIG. 1, the block 100 has a three-dimensional, substantially flat, elongate, rectangular-like shape. The block 100 generally includes a top side 110 and a bottom side 120 with recesses 122,124 adapted to receive forklift blades and four sides 130,140,150,160, two of which are shown in FIGS. 2 and 4.

Preferably, the pinless wheel bumper block 100 is a precast, reinforced concrete block. Alternatively, the block 100 can be formed in other ways, including from separate pieces. The block 100 can also be made of any suitable material of sufficient mass. Due to its mass and the forces of gravity and friction, the block 100 remains in place against the force that is reasonably expected to be applied to it by a wheeled container chassis without being anchored into the surface on which it rests. Alternatively, blocks 100 can be made of lighter materials with rough bottom surfaces to enhance the contact friction between the block 100 and the underlying pavement or ground surface without damaging the pavement or ground surface. For use in a wheeled marine container terminal environment, the block 100 preferably weighs approximately 5,250 pounds, and preferably is approximately fifteen feet long, four feet wide, and seven inches high. Thus, the length of the block 100 is substantially greater than the height of the block 100. With these dimensions, the length being substantially greater than the height herein refers to a length-to-height ratio of approximately 25:1. The weight can vary depending upon the material used and the size of the block 100. The dimensions can be modified in accordance with the invention.

The top 110 of block 100 has a top surface 111 that can be substantially parallel to a lower surface 121. As shown for example in FIG. 2, the dimensions of the top surface 111 are about equal to the dimensions of the lower surface 121. This provides for a relatively flat profile and low center of gravity, which provides stability to the block 100 during use as well as efficiency in stacking for purposes of block storage when not in use.

The four sides of the block 100 include a first end 130, a second end 140, a first side 150, and a second side 160 that extend between top 110 and bottom 120 of block 100. The first end 130 can be substantially parallel to the second end 140. The first end 130 can be substantially perpendicular to both the first side 150 and the second side 160. Likewise, the second end 140 can be substantially perpendicular to both the first side 150 and the second side 160.

Certain edges of the block 100 can be beveled or chamfered to prevent chipping or spalling, including, for example, during handling, transport and stacking. As shown, in FIGS. 3 and 6, for example, each of the first and second ends 130,140 and the first and second sides 150,160 adjacent to the top 110 can include upper beveled portions, which are indicated as 132, 142, 152, and 162, respectively. Each of the first and second ends 130,140 and the first and second sides 150,160 adjacent the bottom 120 can include a chamfered portion, as shown, for example in FIGS. 2 and 6, which are indicated as 134, 144, 154, and 164, respectively.

The bottom 120 can include at least two recesses, shown as a first recess 122 and a second recess 124. The recesses are positioned in the block 100 to receive a lifting device, such as a forklift adapter (as described below), the forks of a heavy-duty forklift, straps, chains, or other suitable devices to lift and transport the blocks 100. The recesses 122, 124 are symmetrical about the center of gravity of the block 100. As the first and second recesses 122,124 are substantially alike, a detailed description of the second recess 124 will not be included. The first recess 122 extends into the block 100 from lower surface 121 and across the entire bottom 120 from the first side 150 to the second side 160 to form an elongate channel that is longer than it is wide. Although the extent of the first recess 122 can vary, especially, depending upon the type of lifting device used and can extend, for example, along only a portion of the bottom 120, be smaller or larger, or form any other suitable shape. Varying the location and configuration of recesses 122,124 may affect the structural stability and durability of the block 100.

As best illustrated in FIGS. 5 and 7, the first recess 122 includes a receiving face 123, a left face 125 and a right face 127. Preferably, left and right faces 125,127 are tapered with respect to the receiving face 123. For example, the receiving face 123 forms a 45 degree angle with the left face 125 as well as the right face 127. The receiving face 123 can form any suitable angle with the left face 125 and the right face 127. This taper can assist in aligning the lifting device into the recesses 122,124 as well as prevent chipping or spalling of the block 100.

The first recess 122 can be formed in the block 100 or can be machined from the block 100. A centerline A of the first recess 122 is at a first distance from the first end 130 and the centerline B of the second recess 124 is at a second distance from the second end 140. The first and second centerline distances are substantially the same.

Figure 12:
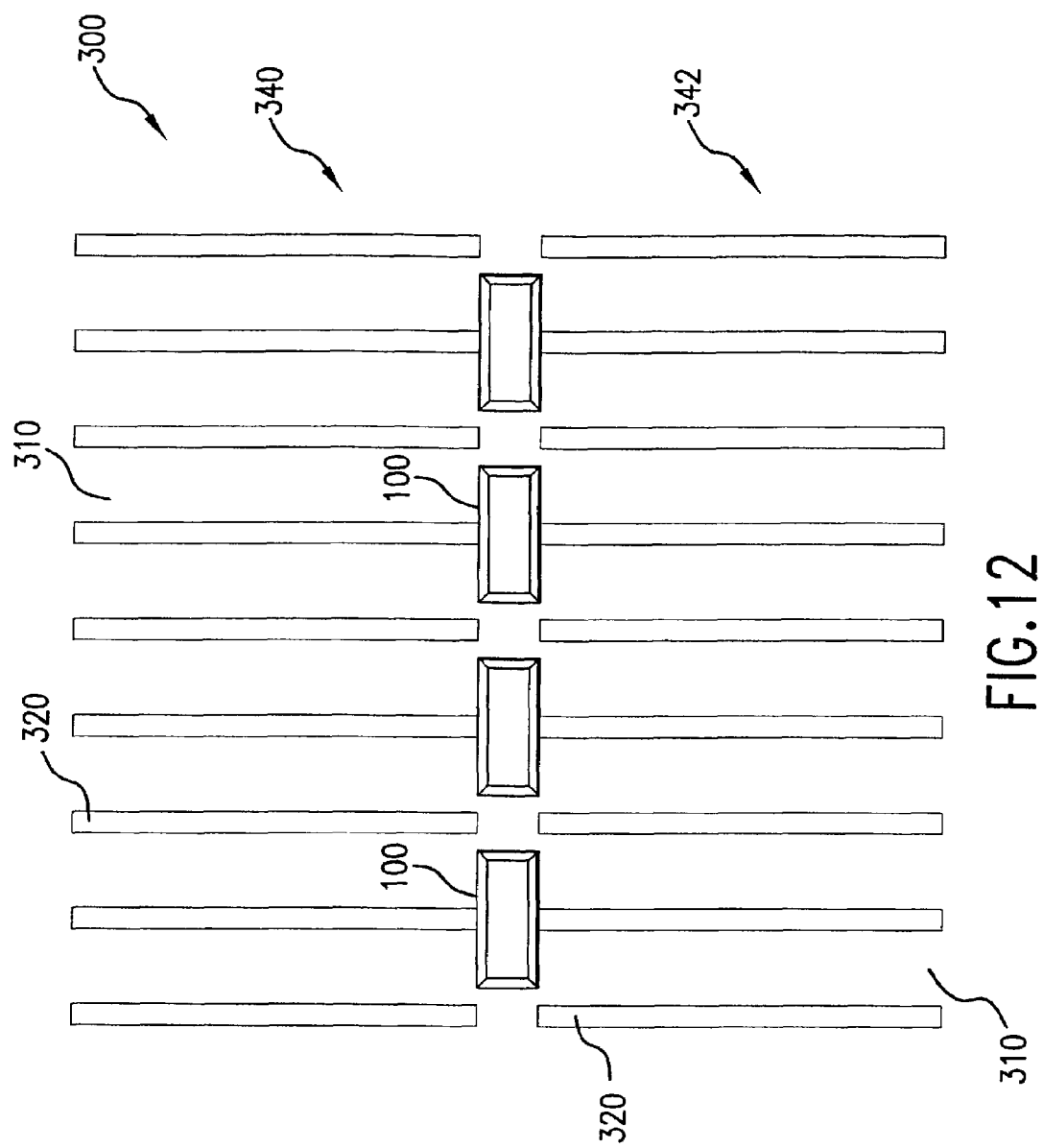
FIG. 12 shows a plan view of a wheeled chassis parking space arrangement in accordance with the principles of the invention using pinless wheel bumper blocks of FIG. 1.

FIG. 12 shows an example of one possible arrangement 300 of the blocks 100. As shown, a parking stall 310 is defined by at least two stall markers 320 and one pinless wheel bumper block 100. The stall marker 320 can be a marking on the pavement to guide a driver of a chassis. In the example shown, two rows 340, 342 of parallel stall markers 320 are arranged with several pinless wheel bumper blocks 100 disposed between the two rows 340, 342 of stall markers 320. The shown configuration allows wheeled container chassis to be parked back-to-back without risk of backing a container chassis too far into the parking stall. The configuration of the blocks 100 can be rearranged easily when parking demand changes and without damage to the underlying pavement or to the block itself. Of course, other arrangements are possible, including arrangements useable in non-marine containerized freight terminals. Depending on the width of the parking stall, the block spacing and block length may vary and vehicles can be driven forward or backward into the parking stalls.

Referring now to FIG. 8, the blocks 100 can be readily stacked during periods of non-use or when rearranging an existing parking configuration. Properly stacked blocks 100 are stable and optimize space. As shown, several blocks 100 can be stacked one atop another. Preferably, a lower surface 121 of the bottom 120 of a first block 100 of a stack rests on the ground or pavement. Next, a lower surface 121 of the bottom 120 of a second block 100 is placed on the top surface 111 of the top 110 of the first block 100. Such placement of the blocks 100 is repeated until a desired number of blocks is stacked. Other stacking configurations are possible. Alternatively, spacers (not shown) can be positioned between stacked blocks 100 as well as between the first block 100 of the stack and the ground or pavement. Spacers can allow an operator to use a forklift, which has a blade that otherwise would be too large to clear a distance between the receiving face 123 of the block 100 and the ground or the top surface 111 of a stacked block. Of course, varying the dimensions of the forklift recesses 122,124 determine dimensions of forklift blades that can be used.

Figure 13:
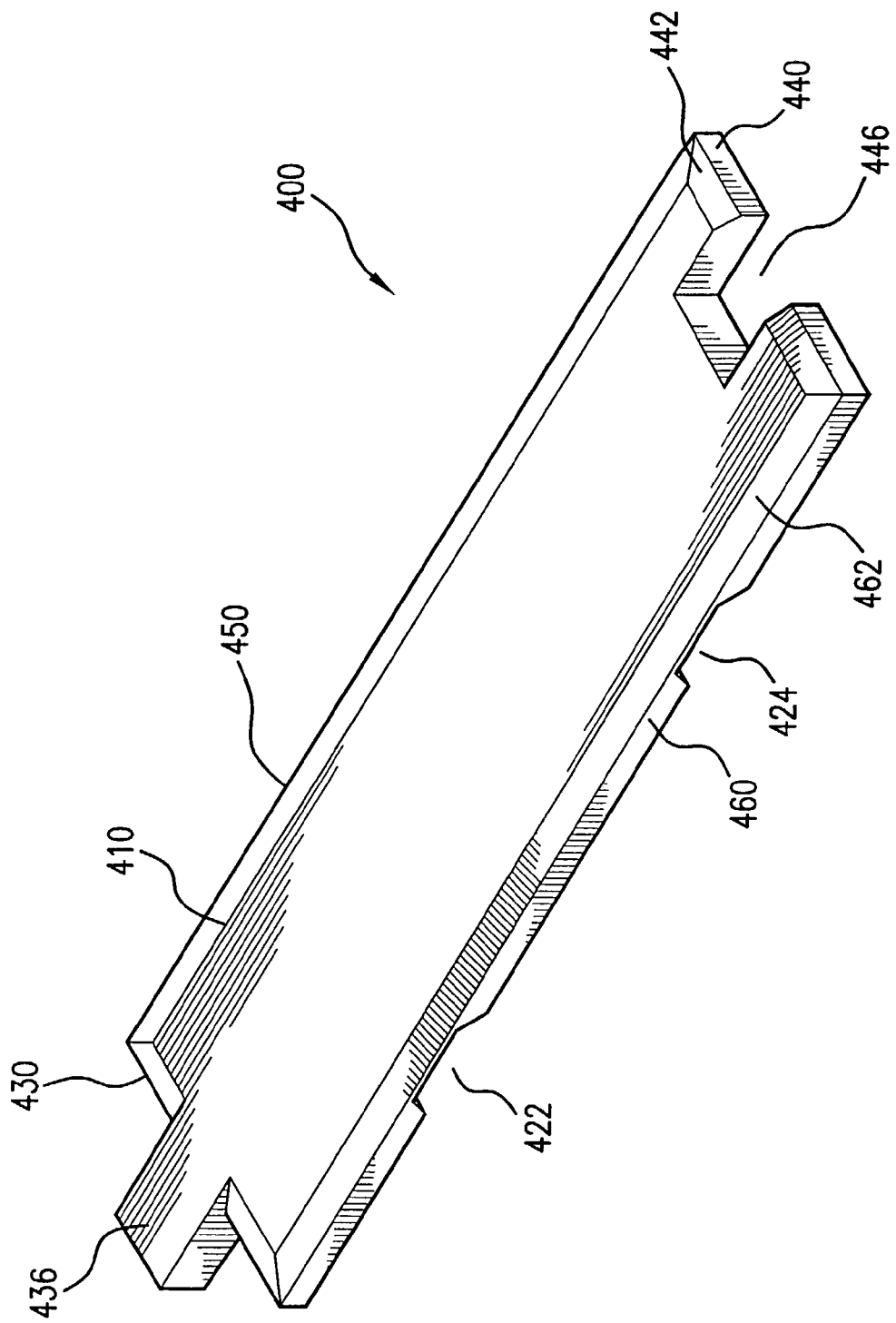
FIG. 13 shows a perspective view of an alternate embodiment of a pinless wheel bumper block made in accordance with the principles of the invention.

FIG. 13 shows another embodiment of the invention in which pinless wheel bumper blocks 400 can interlock with other blocks 400. The block 400 is similar to the first embodiment described above except that the block 400 has an interlocking feature. Thus, similar features will not be described in detail. The block 400 has a three-dimensional, substantially rectangular-like shape. The block 400 generally includes a top side 410 and a bottom side 420 with recesses 422,424 adapted to receive forklift blades and four sides 430,440,450, 460.

Preferably, the pinless wheel bumper block 400 is a precast, reinforced concrete block. Alternatively, the block 400 can be formed in other ways, including from separate pieces. The block 400 can also be made of any suitable material of sufficient mass. Due to its mass and the forces of gravity and friction, the block 400 remains in place against the force that is reasonably expected to be applied to it by a wheeled container chassis without being anchored into the surface on which it rests. For example, the block 400 can be made of wood, timber, solid plastics, or molded plastic shells filled with water, sand, stone, or the like. Alternatively, blocks 400 can be made of lighter materials with rough bottom surfaces to enhance the contact friction between the block 400 and the underlying pavement or ground surface without damaging the pavement or ground surface. Because of the interlocking structure, the block 400 can have a weight less than the weight of the block 100. As discussed above, the weight can also vary depending upon the material used and the size of the block 400. Other types of interlocking or interconnecting structures in accordance with the principles of the invention are possible.

The block 400 as shown includes a top 410, a bottom 420, a first end 430, a second end 440, a first side 450, and a second side 460. The top 410 has a top surface 411 that can be substantially parallel to a lower surface 421. The first end 430 can be substantially perpendicular to both the first side 450 and the second side 460. Likewise, the second end 440 can be substantially perpendicular to both the first side 450 and the second side 460. The first end 430 includes a tongue 436 disposed in a middle portion of the first end 430 and preferably forms a substantially square-like projection from the first end 430. The second end 440 includes a groove 446 that is adapted to receive the tongue 436. Thus, arranging a series of blocks 400 with first end 430 next to second end 440 and engaging the tongue 436 and the groove 444 can form a length of interlocking blocks 400.

Although the embodiments described above include recesses for being lifted by a forklift, the blocks in accordance with the invention do not require recesses for lifting and can be lifted using other devices where the block may not have corresponding structure. FIGS. 15-16 show another embodiment of the pinless wheel bumper block 600, which is similar to the first embodiment described above, but the block 600 is not provided with recesses and is lifted using an alternate lifting device in an alternate manner (described below). Thus, like elements will not be described in detail. This alternate embodiment also has a three-dimensional, substantially rectangular-like shape.

Preferably, the block 600 is a precast, reinforced concrete block. Alternatively, the block 600 can be formed in other ways, including from separate pieces. The block 600 also can be made of any suitable material of sufficient mass. Due to its mass and the forces of gravity and friction, the block 600 remains in place against the force that is expected to be applied to it by a wheeled container without being anchored into the surface on which it rests. As discussed above, the weight can vary depending upon the material used, the size of the block 600, and the surface friction between the block 600 and the ground or underlying pavement.

The block 600 includes a top 610, a bottom 620, a first end 630, a second end 640, a first side 650, and a second side 660. The first end 630 can be substantially perpendicular to both the first side 650 and the second side 660. Likewise, the second end 640 can be substantially perpendicular to both the first side 650 and the second side 660. The top 610 has a top surface 611 that can be substantially parallel to a lower surface 621 of the bottom 620. The top 610 is not uniform, but includes at least one depression 612 formed therein. As shown in FIG. 15, block 600 includes two depressions 612. Preferably, the depression 612 resembles a hemisphere, and in cross-section the cavity resembles a concave portion of a semicircle. Other configurations are possible. As best shown in FIG. 16, which is a cross-section taken along the line A-A in FIG. 15, embedded in the block 600 is a lifting device insert 613. Lifting device insert 613 generally includes a top portion 616 and a bottom portion 615 interconnected by a post 617. Preferably, a top surface 614 of the lifting device 613 is flush with the top surface 611 of the block 600, which allows blocks 600 to be stacked atop each other. Alternatively, as shown in FIG. 15a, a top surface 614a of the lifting device 613a extends beyond the top surface 611 of the block 600. To stack blocks 600 atop each other, a pocket 622, corresponding to the placement and size of the lifting device 613, can be formed in the lower surface 621 of the bottom 620 of the block 600.

As illustrated in FIG. 16, the bottom portion 615 of the lifting device 613 is preferably larger than the top portion 616 of the lifting device 613 to provide the lifting device 613 with sufficient engagement with the block 600 to prevent the lifting device 613 from being pulled-out of the block 600 when lifted. Bottom portion 615 can be in the shape of a post, disc, plate, eye, bend, bent rod, or any other configuration desired. The bottom portion 615 and a part of post 617 of the lifting device 613 are embedded in the block 600 beneath a cavity surface 612a. The bottom portion 615 and part of post 617 of the lifting device 613 are set in the block 600 during casting of the block 600. Alternatively, the lifting device 613 can be drilled or inserted into the block 600 after the block 600 has been cast. Preferably, the lifting device 613 is a lifting eye, i.e., an eyebolt or any hook-like or ring-like structure. The lifting device 613 can have alternate configurations in accordance with the invention, including, for example, a hook-like structure, a nail-head-like cross-section, or an I-beam-like cross-section. This block 600 is transported by coupling a strap, chain, harness, or the like to the top portion 616 of the lifting device 613. The use of depressions 612 and lifting device insert 613 in block 600 may have greater overall structural strength and durability than blocks having forklift recesses as described above.

The blocks as described with reference to FIGS. 1-8 and 13 can be transported in a variety of ways, including, but not limited to the use of a compatible forklift or by using an incompatible forklift equipped with a forklift adapter 200 in accordance with the principles of the invention. As used herein, the term "compatible forklift" is used to denote a forklift that has properly sized blades to engage a particular load, for example the bumper block 100. Blade sizing can refer to any or all of fork blade width, thickness, and length, as well as fork blade spread. Blade spread refers to the distance between the two forks. Generally, as used herein, the term "compatible forklift" refers to a forklift with a blade spread range that is capable of lifting and transporting a given load. The blade spread range can vary from the blades being adjacent one another to the blades extending a maximum distance opposite one another. As used herein, an "incompatible forklift" is one in which the blade spread is inadequate for safely lifting and transporting a given load, i.e., an out-of-gage load. In other words, lifting and transporting an out-of-gage load would require a greater or lesser blade spread range than the existing blade spread range of an incompatible forklift.

Referring now to FIGS. 9-11, a forklift adapter 200 is shown coupled with blades F1,F2 (shown in phantom lines) of an incompatible forklift F (shown in phantom lines). Although shown with reference to wheel bumper blocks, the forklift adapter 200 is not limited to lifting and transporting wheel bumper blocks. The forklift adapter 200 can lift and transport a variety of other loads, such as lumber and pallets. Thus, the forklift adapter 200 has its own set of adapter blades 246,256, adapted to lift and transport the blocks 100 using an incompatible forklift F that would not otherwise be capable of lifting the blocks 100. The adapter 200 is preferably made of steel or can be made of any suitable material. The adapter 200 is preferably formed of separate parts, which are coupled by welding or other appropriate coupling means, but can be formed in other ways. As shown in FIG. 11, a forklift with a maximum blade spread D1 is an incompatible forklift and is incapable of lifting and transporting the illustrated stack of blocks. The forklift adapter 200 has a maximum blade spread of D2, which is greater than D1. The blade spread D2 is sufficient to lift and export the load depicted in FIG. 11, whereas the blade spread D1 is not. Thus, the forklift adapter 200 can convert an incompatible forklift to a compatible forklift. Alternatively, the forklift adapter 200 can have a blade spread that is smaller than the blade spread of an incompatible forklift adapter.

The forklift adapter 200 as shown, generally resides below the blades F1,F2 of the incompatible forklift F (see, for example, FIG. 10). The forklift adapter 200 includes first and second mounting tubes 210,220, a mounting bar 230, and first and second block supports 240,250. The first and second mounting tubes 210,220 are each adapted to accommodate blades F1,F2 of an incompatible forklift F. Thus, the first and second mounting tubes 210,220 are hollow in cross-section and tapered along their length. Alternatively, the mounting tubes 210,220 are not tapered. Whether or not the mounting tubes 210,220 are tapered depends on whether the forklift and blades are tapered.

The first and second mounting tubes 210,220 are connected by the mounting bar 230 that extends substantially perpendicular to the length of tubes 210,220. A first end 232 of the mounting bar 230 is coupled to the first mounting tube 210 and a second end 234 of the mounting bar 230 is coupled to the second mounting tube 210. The first and second ends 232,234 of the mounting bar 230 are disposed on opposite ends of the mounting bar 230. The mounting bar 230 can be solid or hollow in cross-section.

As the first and second block supports 240,250 are virtually the same, only the first block support 240 will be described in detail. The first block support 240 includes a mounting bar attachment 242, a vertical member 244, and the adapter blade 246. The first block support 240 can be a unitary whole or can be manufactured of separate components. The mounting bar attachment 242 can be substantially similar in cross-section and material as the mounting bar 230. Additionally, the mounting bar attachment 242 can be substantially axially aligned with the mounting bar 230. The vertical member 244 is coupled to and extends away from the mounting bar attachment 242 and is substantially perpendicular to the first mounting tube 210. The vertical member 244 can preferably include a rubber pad on a face that contacts the blocks 100 to prevent damage to the blocks 100 during transport. To provide additional structural support to first block support 240, stiffening members can be used as shown. Other arrangements of structural supports can be used as well. A first stiffening member 247 connects the vertical member 244 to the mounting bar 230, and a first support 248 connects the vertical member to the first mounting tube 210. The adapter blade 246 extends perpendicularly from the vertical member 244. The vertical member 244 and the adapter blade 246 generally form an L-shape. The adapter blade 246 is substantially parallel to the first mounting tube 210. The adapter blade 246 is adapted to engage the first and second recesses 122,124 of the block 100. Likewise, first and second block supports 240,250 are spaced apart from each other by a distance so as to correspond to the distance between recesses 122,124 in block 100. The adapter 200 is preferably free-standing when not in use, which facilitates the mounting and dismounting of the adapter 200 with non-compatible forklifts. Alternatively, where the adapter 200 is not free-standing, supports (not shown) may be added to the adapter 200 or may be external to the adapter 200 to facilitate the mounting/dismounting of the adapter 200 with non-compatible forklifts.

In operation, a forklift operator guides the forklift blades F1,F2 through the first and second mounting tubes 210,220 of the adapter 200. Once the adapter 200 is securely in position on the forklift, the operator can direct the adapter 200 to a block 100 or a stack of blocks 100 as shown in FIGS. 10 and 11. Although not shown, devices such as bolts, pins, stay-chains, brackets, straps, braces, friction fits, wedges, or other securing means can be used to secure the adapter 200 to the non-compatible forklift F. To place the blocks 100 on the adapter 200, the forklift operator engages the first and second recesses 122,124 with the adapter blades 246,256 of the first and second block supports 240,250 of the forklift adapter 200. Once the blocks 100 are firmly on the adapter 200, as illustrated in FIGS. 10 and 11, the forklift operator can lift and transport the blocks 100 to a desired location for placement.

Figure 14:
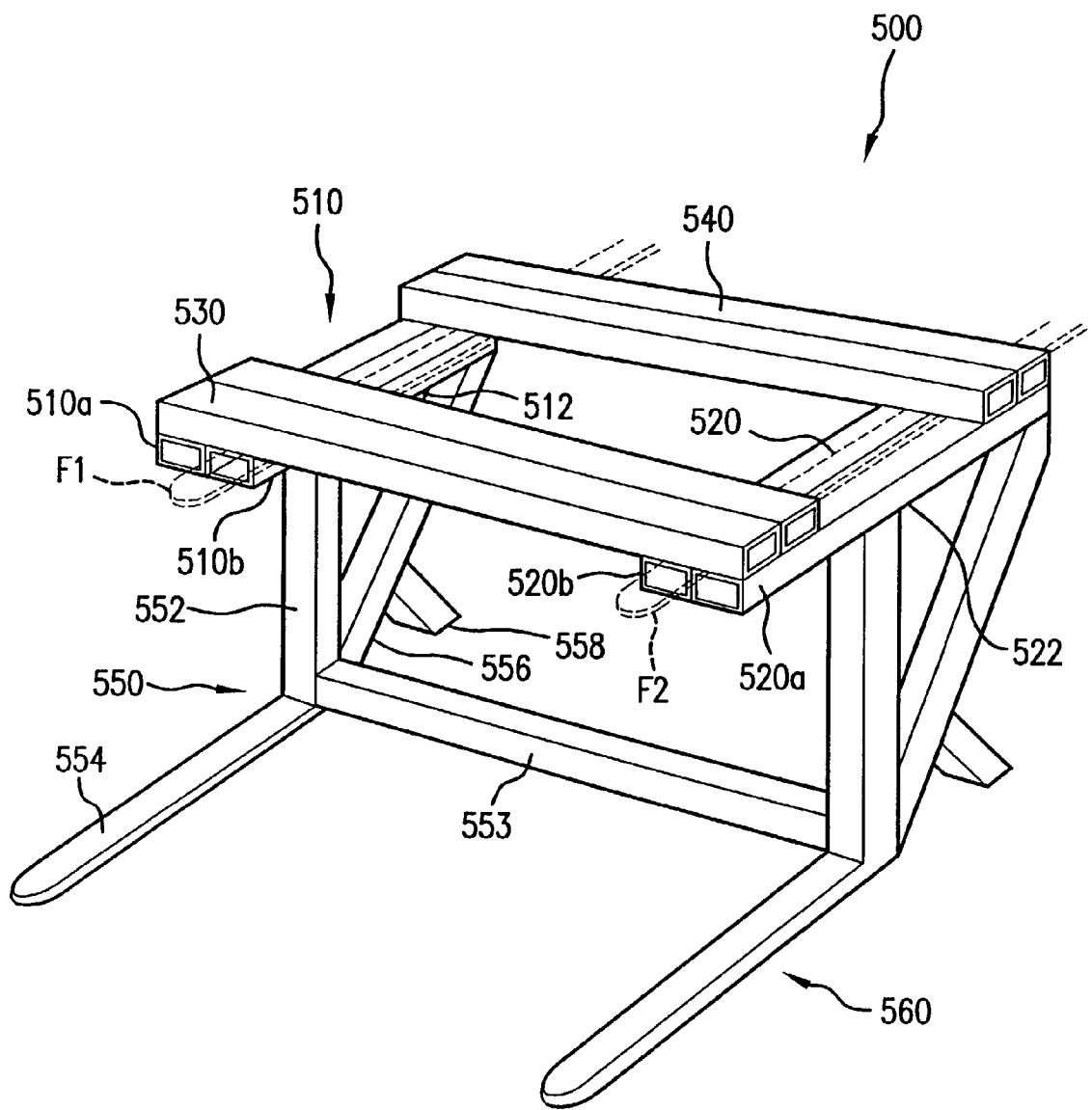
FIG. 14 shows a perspective view of an alternate embodiment of a forklift adapter made in accordance with the principles of the invention.
Figure 17:
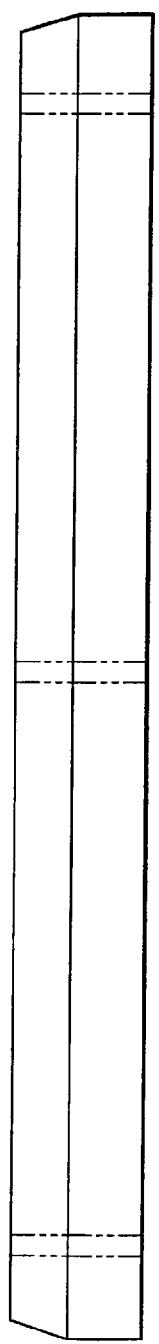
FIG. 17 shows a side elevation view of a related art pinned wheel bumper block.
Figure 18:
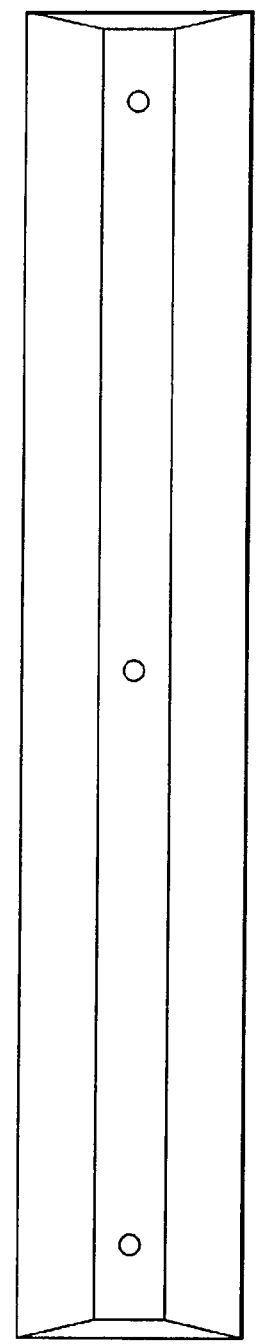
FIG. 18 shows a top plan view of the related art pinned wheel bumper block of FIG. 17.
Figure 19:
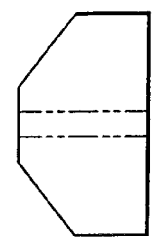
FIG. 19 shows another side view of the related art pinned wheel bumper block of FIG. 17.
Figure 21:
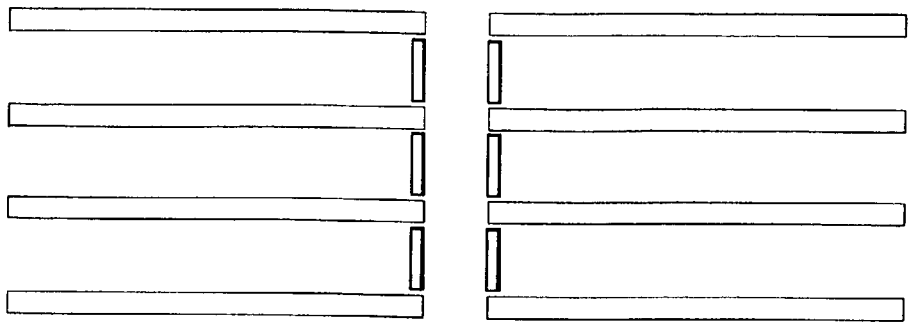
FIG. 21 shows a plan view of another wheeled chassis parking space arrangement using related art pinned wheel bumper blocks.
Figure 20:
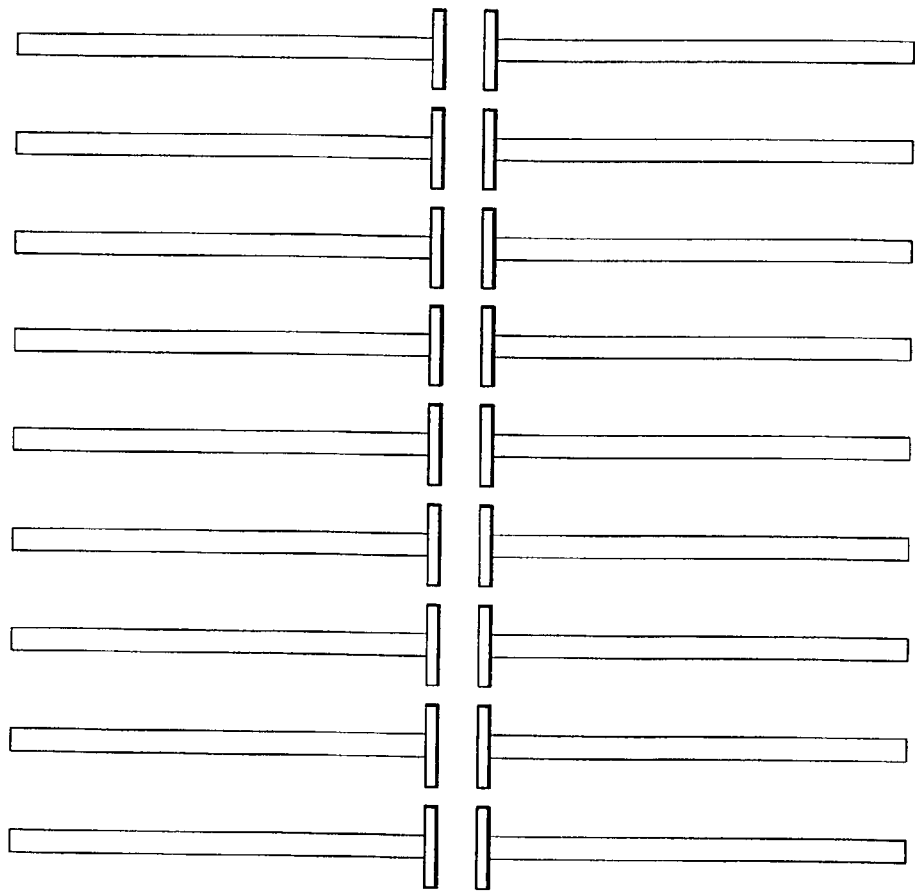
FIG. 20 shows a plan view of a wheeled chassis parking space arrangement using related art pinned wheel bumper blocks.

FIG. 14 shows another embodiment of a forklift adapter 500 according to the principles of the invention. The forklift adapter 500 generally resides below the blades F1,F2 of the non-compatible forklift. The forklift adapter 500 includes first and second side sections 510,520, front and rear lateral supports 530,540, and first and second fork assemblies 550, 560.

Preferably, the first and second side sections 510,520 are substantially parallel. Each of the first and second side sections 510,520 have two hollow, square cross-sections coupled together. The first side section 510 includes an outer side 510a and an inner side section 510b. The outer and inner side sections 510a, 510b are adjacent and coplanar. The inner side section 510b is hollow and adapted to receive a blade F1 of an incompatible forklift (not shown). The front and rear lateral supports 530,540 are each formed of two adjoining hollow, square cross-sections coupled together and are substantially parallel to one another. Alternatively, each of the front and rear lateral supports 530,540 can be formed of a unitary whole, of a different cross-section, or solid. The front and rear lateral supports 530,540 are substantially perpendicular to the first and second side sections 510,520. The front and rear lateral supports 530,540 extend between and are coupled to portions of the first and second side sections 510,520. The first and second side sections 510,520 and the front and rear lateral supports 530,540 form a generally rectangular shape. Coupled to an underside 512 of the outer side section 510a of the first side section 510 is the first fork assembly 550. The outer and inner side sections 520a,520b of the second side section 520 are adjacent and coplanar. The inner side section 520b of the second side section 520 is hollow and adapted to receive another blade F2 of the incompatible forklift (not shown). Coupled to an underside 522 of the outer side section 520a of the second side section 520 is the second fork assembly 560. A stiffening bar 553 couples the first and second forklift assemblies 550,560. The stiffening bar 553 can be coupled to the first and second forklift assemblies 550,560 by welding or other suitable means. The stiffening bar 553 is preferably made of steel, has a square cross-section and is hollow. The stiffening bar can be made of any other suitable material and cross-section and can be solid. As the first and second forklift assemblies 550,560 are virtually the same, only the first forklift assembly 550 will be described in detail herein.

The first forklift assembly 550 includes a first vertical member 552, a first horizontal member 554, a first strut 556, and a first support 558. The first forklift assembly 550 can be formed of separate components and coupled together by, for example, welding. Alternatively, the forklift assembly 550 can be formed as a unitary whole.

The first vertical member 552 is coupled to and depends from the underside 512 of the outer side section 510a of the first side section 510. Coupled to the first vertical member 552 is the first horizontal member 554. The first horizontal member 554 is adapted to engage the first and second recesses 122,124 of the block 100. The first horizontal member 554 is substantially perpendicular to the first vertical member 552. The first vertical and horizontal members 552,554 generally form an L-shape. The first strut 556 couples the first vertical member 552 to the underside 512. The underside 512, the first vertical member 552, and the first strut 556 form a generally triangular shape. Also coupled to the first vertical member is the stiffening bar 553. The first support 558 is coupled to and substantially perpendicular to the first strut 556. When not in use, the forklift adapter 500 rests on the ground or pavement with the first support 558 and the first horizontal member 554 in contact with the ground or pavement.

The use and operation of the forklift adapter 500 is substantially similar to that described above for the forklift adapter 200. Thus, similarities will not be repeated herein. To secure the forklift adapter 500 to the non-compatible forklift F, the forklift operator positions the forklift F near the forklift adapter 500. To engage the forklift F with the forklift adapter 500, the forklift operator extends the forklift blades F1,F2 and penetrates the inner side 510b of the first side section 510 and the inner side 520b of the second side section 520 so as to secure the forklift (not shown) to the forklift adapter 500. Although not shown, the forklift adapter 500 can be further secured to the forklift F by bolts, pins, stay-chains, brackets, straps, braces, friction fits, wedges or other securing means. Thus, the forklift adapter 500 can convert an incompatible forklift to a compatible forklift.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. An anchorless wheel bumper block for use as a stop in a parking facility, the block comprising:
    a base having a bottom surface, wherein the bottom surface rests on a ground surface and the block is in contact with and unattached to the ground surface in an in-use position, the bottom surface being disposed in a first plane and having a length and a width;
    a top having an upper surface, the upper surface being disposed in a second plane generally parallel to the first plane and having a length substantially equal to the length of the bottom surface and a width substantially equal to the width of the bottom surface, wherein a distance between the bottom and upper surfaces defines a height of the block, the length of the bottom surface is substantially greater than the height of the block, the bottom surface has a surface area substantially equal to a surface area of the upper surface, and the upper surface is adapted to engage the bottom surface of another block such that a plurality of blocks in a non-use position may be stably stacked together to form a stack that may be moved for storage, the stack comprising single blocks stacked one on top of another;
    a side extending around a perimeter of the block and between the bottom and upper surfaces, wherein the block remains substantially in the in-use position when a wheel of a wheeled unit contacts the block; and
    at least two channels disposed in the base, the channels having a size and spacing adapted to receive blades of a forklift to enable the bumper block to be lifted and moved,
    wherein the length of the bottom surface is approximately fifteen feet, a width of the bottom surface is approximately four feet, and the height of the block is approximately seven inches.

2. An anchorless wheel bumper block for use as a stop in a parking facility, the block comprising:
    a base having a bottom surface, wherein the bottom surface rests on a ground surface and the block is in contact with and unattached to the ground surface in an in-use position, the bottom surface being disposed in a first plane and having a length and a width;
    a top having an upper surface, the upper surface being disposed in a second plane generally parallel to the first plane and having a length substantially equal to the length of the bottom surface and a width substantially equal to the width of the bottom surface, wherein a distance between the bottom and upper surfaces defines a height of the block, the length of the bottom surface is substantially greater than the height of the block, the bottom surface has a surface area substantially equal to a surface area of the upper surface, and the upper surface is adapted to engage the bottom surface of another block such that a plurality of blocks in a non-use position may be stably stacked together to form a stack that may be moved for storage, the stack comprising single blocks stacked one on top of another;
    a side extending around a perimeter of the block and between the bottom and upper surfaces, wherein the block remains substantially in the in-use position when a wheel of a wheeled unit contacts the block; and
    at least two channels disposed in the base, the channels having a size and spacing adapted to receive blades of a forklift to enable the bumper block to be lifted and moved,
    wherein a weight of the block is approximately 5,250 pounds.

3. An anchorless wheel bumper block for use as a stop in a parking facility, the block comprising:
    a base having a bottom surface, wherein the bottom surface rests on a ground surface and the block is in contact with and unattached to the ground surface in an in-use position, the bottom surface being disposed in a first plane and having a length and a width;
    a top having an upper surface, the upper surface being disposed in a second plane generally parallel to the first plane and having a length substantially equal to the length of the bottom surface and a width substantially equal to the width of the bottom surface, wherein a distance between the bottom and upper surfaces defines a height of the block, the length of the bottom surface is substantially greater than the height of the block, the bottom surface has a surface area substantially equal to a surface area of the upper surface, and the upper surface is adapted to engage the bottom surface of another block such that a plurality of blocks in a non-use position may be stably stacked together to form a stack that may be moved for storage. the stack comprising single blocks stacked one on top of another;

a side extending around a perimeter of the block and between the bottom and upper surfaces, wherein the block remains substantially in the in-use position when a wheel of a wheeled unit contacts the block; and at least two channels disposed in the base, the channels having a size and spacing adapted to receive blades of a forklift to enable the bumper block to be lifted and moved, wherein a ratio of the length of the bottom surface to the height is approximately 25:1.

4. A wheeled parking system including wheeled unit parking locations, the system comprising:

a ground surface in an original condition; and an anchorless wheel bumper block for use as a wheel stop, the block having a substantially flat and elongate shape and including a base having a bottom surface disposed in a first plane, wherein the bottom surface rests unattached on the ground surface and the block is unattached to the ground surface in an in-use position, the bottom surface having a width and a length, a top extending from the base having an upper surface disposed in a second plane substantially parallel to the first plane, the upper surface having a width substantially equal to the width of the bottom surface and a length substantially equal to the length of the bottom surface such that the bottom surface has a surface area substantially equal to a surface area of the upper surface, a side extending around a perimeter of the block and between the bottom and upper surfaces, wherein the block is disposed at an end of the wheeled unit parking location, whereby the block prevents a wheeled unit from exiting the wheeled unit parking location and when a wheel of the wheeled unit contacts the block, the block remains in substantially the in-use position, and when the block is lifted from the ground surface and moved to a non-use position the ground surface remains substantially in the original condition, and when in the non-use position the block is stably stackable on another anchorless wheel bumper block such that the upper surface of the block engages the bottom surface of another block to form a stack;

wherein the block is adapted to be lifted from the ground surface and moved to a non-use condition by a forklift, and wherein the length of the bottom surface is approximately fifteen feet, the width of the bottom surface is approximately four feet, and a height of the block is approximately seven inches.

5. A wheeled parking system including wheeled unit parking locations, the system comprising:

a ground surface in an original condition;

an anchorless wheel bumper block for use as a wheel stop, the block having a substantially flat and elongate shape and including a base having a bottom surface disposed in a first plane, wherein the bottom surface rests unattached on the ground surface and the block is unattached to the ground surface in an in-use position, the bottom surface having a width and a length, a top extending from the base having an upper surface disposed in a second plane substantially parallel to the first plane, the upper surface having a width substantially equal to the width of the bottom surface and a length substantially equal to the length of the bottom surface such that the bottom surface has a surface area substantially equal to a surface area of the upper surface, a side extending around a perimeter of the block and between the bottom and upper surfaces, wherein the block is disposed at an end of the wheeled unit parking location, whereby the block prevents a wheeled unit from exiting the wheeled unit parking location and when a wheel of the wheeled unit contacts the block, the block remains in substantially the in-use position, and when the block is lifted from the ground surface and moved to a non-use position the ground surface remains substantially in the original condition, and when in the non-use position the block is stably stackable on another anchorless wheel bumper block such that the upper surface of the block engages the bottom surface of another block to form a stack;

wherein the block is adapted to be lifted from the ground surface and moved to a non-use condition by a forklift, and wherein a weight of the block is approximately 5,250 pounds.

6. An anchorless wheel bumper block for use as a stop in a parking facility, the block comprising:

a base having a bottom surface, wherein the bottom surface rests on a ground surface and the block is in contact with and unattached to the ground surface in an in-use position, the bottom surface being disposed in a first plane and having a length and a width;

a top having an upper surface, the upper surface being disposed in a second plane generally parallel to the first plane and having a length substantially equal to the length of the bottom surface and a width substantially equal to the width of the bottom surface, wherein a distance between the bottom and upper surfaces defines a height of the block, the length of the bottom surface is substantially greater than the height of the block, the bottom surface has a surface area substantially equal to a surface area of the upper surface, and the upper surface is adapted to engage the bottom surface of another block such that a plurality of blocks in a non-use position may be stably stacked together to form a stack that may be moved for storage, the stack comprising single blocks stacked one on top of another;

a side extending around a perimeter of the block and between the bottom and upper surfaces, wherein the block remains substantially in the in-use position when a wheel of a wheeled unit contacts the block; and at least two channels disposed in the base, the channels having a size and spacing adapted to receive blades of a forklift to enable the bumper block to be lifted and moved, wherein the side comprises a first end and a second end generally perpendicular to the first and second planes and between the base and the top, the first end being generally parallel to the second end, and a first side surface and a second side surface generally perpendicular to the first and second planes and between the base and the top, the first side surface being generally parallel to the second side surface, the first and second side surfaces being generally perpendicular to the first and second ends, and wherein the side further comprises a beveled portion between the upper surface and each of the first and second ends and the first and second side surfaces.

7. An anchorless wheel bumper block for use as a stop in a parking facility, the block comprising:

a base having a bottom surface, wherein the bottom surface rests on a ground surface and the block is in contact with and unattached to the ground surface in an in-use position, the bottom surface being disposed in a first plane and having a length and a width;

a top having an upper surface, the upper surface being disposed in a second plane generally parallel to the first plane and having a width substantially equal to the width of the bottom surface and a length substantially equal to the length of the bottom surface such that the bottom surface has a surface area substantially equal to a surface area of the upper surface, wherein a distance between the bottom and upper surfaces defines a height of the block, the length of the bottom surface is substantially greater than the height of the block; and a side extending around a perimeter of the block and between the bottom and upper surfaces, wherein the block remains substantially in the in-use position when a wheel of a wheeled unit contacts the block, the side includes a first pair of opposing side surfaces along the length of the bottom surface and a second pair of opposing side surfaces along the width of the bottom surface, the block adapted such that a plurality of wheels of respective wheeled units may contact the block on either side surface of the pair of opposing side surfaces along the length of the bottom surface in the in-use position, wherein each side surface of the first and second pairs of opposing side surfaces comprises a beveled portion.

8. An anchorless wheel bumper block for use as a stop in a parking facility, the block comprising:

a base having a bottom surface, wherein the bottom surface rests on a ground surface and the block is in contact with and unattached to the ground surface in an in-use position, the bottom surface being disposed in a first plane and having a length and a width;

a top having an upper surface, the upper surface being disposed in a second plane generally parallel to the first plane and having a width substantially equal to the width of the bottom surface and a length substantially equal to the length of the bottom surface such that the bottom surface has a surface area substantially equal to a surface area of the upper surface, wherein a distance between the bottom and upper surfaces defines a height of the block, the length of the bottom surface is substantially greater than the height of the block, the top is adapted to engage the base of another block such that a plurality of blocks in a non-use position may be stably stacked together to form a stack that may be moved for storage, wherein the stack comprises single blocks stacked one on top of another;

a side extending around a perimeter of the block and between the bottom and upper surfaces, wherein the block remains substantially in the in-use position when a wheeled unit contacts the block, the side includes a first pair of opposing side surfaces along the length of the bottom surface and a second pair of opposing side surfaces along the width of the bottom surface, the block adapted such that a plurality of wheels of respective wheeled units may contact the block on either side surface of the pair of opposing side surfaces along the length of the bottom surface in the in-use position; and at least two channels disposed in the base, the channels having a size and spacing adapted to receive blades of a forklift to enable the block to be lifted and moved, wherein each side surface of the first and second pairs of opposing side surfaces comprises a beveled portion.

\* \* \* \* \*